(12) United States Patent
Ziv et al.

(10) Patent No.: US 6,639,706 B2
(45) Date of Patent: Oct. 28, 2003

(54) OPTICAL PATH SWITCH AND METHOD OF USING THEREOF

(75) Inventors: Ofer R. Ziv, Newton, MA (US); Jack Fiore, Grayslake, IL (US); Philip Uy, Antrim, NH (US); Danny Filipovich, Lincoln, IL (US)

(73) Assignee: Kollsman, Inc., Merrimack, NH (US)

( * ) Notice: Subject to any disclaimer, the term of this patent is extended or adjusted under 35 U.S.C. 154(b) by 0 days.

(21) Appl. No.: 10/055,815

(22) Filed: Jan. 23, 2002

(65) Prior Publication Data

US 2002/0126363 A1 Sep. 12, 2002

Related U.S. Application Data

(60) Provisional application No. 60/263,777, filed on Jan. 24, 2001.

(51) Int. Cl.[7] .................. G02B 26/00; G02B 27/14; G02F 1/01
(52) U.S. Cl. .............. 359/238; 359/630; 359/631; 359/638; 345/7; 345/8
(58) Field of Search .................... 359/238, 630, 359/633, 631, 638; 345/7, 8

(56) References Cited

U.S. PATENT DOCUMENTS 6,091,546 A * 7/2000 Spitzer ................ 359/618
6,204,974 B1 * 3/2001 Spitzer ................ 359/630

* cited by examiner

Primary Examiner—Hung Xuan Dang
Assistant Examiner—Joseph Martinez
(74) Attorney, Agent, or Firm—William B. Ritchie

(57) ABSTRACT

An optical path switch and a method of using thereof, for creating two optical pathways for input light. The switch is composed of two polarizers that polarize the input light and two polarization rotators each having two positions. The polarization rotators position translates to one of two the optical pathways. Additionally, the optical path switch has an image enhancement device for producing an enhanced image of the light, and a beam splitter that directs the light to two channels. The optical path switch works by polarizing the light by one of the two polarizers producing an output, following, the output is then directed through the beam splitter where the output is directed towards the two channels. Next, the output is then filtered through the two polarization rotators and to the other of the two channels where the positions of the two polarization rotators switch the optical pathways.

6 Claims, 2 Drawing Sheets

OPTICAL PATH SWITCH AND METHOD OF USING THEREOF

This application claims benefit under Title 35, United States Code §119, §120 of U.S. Provisional Application No. 60/263,777, dated Jan. 24, 2001.

FIELD OF THE INVENTION

This invention relates to the field of optical devices, in particular, to a method and apparatus for switching an optical path from an enhanced view to a direct view, and having modes where the viewer can see both simultaneously.

BACKGROUND OF THE INVENTION

It is sometimes required to superimpose an optical image derived electronically on to an external scene viewed through an eyepiece by an observer so that the observer can see both the electronic image as well as the external scene together. This requirement has been addressed in the prior art so, as to permit, for example, a pilot to see flight data superimposed on an external scene.

In some applications of sights the need may arise for image enhancement of the observed scenery before displaying it to the observer.

Although in use for years, head mounted display (HMD) systems have been the subject of continual development and improvement. Applications of such systems range from flight and weapons control for military aircraft to display systems for games. Of particular interest are displays which combine multiple images. For example, most modern military aircraft use heads-up display technology to superimpose information for a variety of flight and weapons systems over the pilot's natural view of the outside world. This provides the pilot with additional information without requiring that the pilot look down towards the instrument panes. A second use of head mounted systems is for night vision goggles in which the user is presented with both a natural image of the outside world as well as an artificial image in which the light levels have been intensified. A third use for such systems is to provide a pilot or other user with a low resolution, wide field-of-view image of a particular scene combined with a high resolution image of a small section of the same scene. This allows the user to retain knowledge of the overall surroundings while obtaining detailed information about a particular area of interest.

Currently, there are two basic approaches to providing a user simultaneously with multiple images. The first or binocular approach presents both eyes of the user with both images. For example, a pilot may use a see-through HMD of this type which allows a natural view of the outside world. The desired additional information is provided using a projected image, typically projected on the pilot's visor. The second or monocular approach provides each eye of the user with different image information. For example, a pilot flying at night can be presented with a natural view as well as a light intensified view, each view being provides to a separate eye. One advantage of this system is that the eye which is not viewing the light intensified scene remains dark adapted.

U.S. Pat. No. 5,162,828 to Furness et. al. discloses a display system for conventional spectacles having a transparency that defines a field of view and a frame for supporting the transparency on a user's head. The display system includes a display mounted on the frame of the spectacles and optics for collimating light to project an image of the displayed information at a distance from the user in the periphery of the field of view defined by the transparency. According to one embodiment, the optics includes a single mirror which receives the information directly from the display and projects an enlarged image at an apparent optical distance from the user that is greater then the actual optical path length. Alternatively, a planar mirror and collimating lens may be employed.

Such systems are commonly mounted on, or in conjunction with, a pilot's head up display and typically employ a miniature CDD TV camera mounted either on the head up display or to a visor thereof. For example, U.S. Pat. No. 5,341,242 to Gilboa et. al. discloses an optical projector which projects an image on to the semi-transparent portion for reflection from it. The semi-transparent portion has a relatively higher reflectivity in a central area and a relatively lower reflectivity in an annular area outside the central area. In accordance with one embodiment, the head mounted display included a projector having a display source where an image is formed. An optical system for focusing the image at separate sagittal and tangential foci is provided between the image-forming surface and the semi-transparent portion. Such an arrangement may be employed in a visor attached to a pilot's helmet, such that the visor has a partially reflecting semi-transparent portion in view of the pilot.

U.S. Pat. No. 4,398,799 to Swift discloses a pilot's head-up display wherein an image of selected display information is superimposed by means of a combiner on an external scene and reflected towards the pilot's eyes by means of a mirror disposed on his helmet in such a manner so as to not to interfere with his vision.

U.S. Pat. No. 5,113,177 to Cohen discloses a display system for enabling a pilot in an aircraft to view simultaneously an image of selected display information and a scene external to the aircraft during low visibility conditions, such as night-time. An image intensifier tube is mounted on the side of a pilot's helmet so that the image sensed coincides with the pilot's field of view. The image intensifier tube intensifies the light from the external scene and output voltages representative of the scene to a converter whose output is itself converted to a suitable video signal with video signals from other sources, such as instrumentation panel displays. The combined electrical signals are fed to a display driver so as to allow superimposition of the selected display information on the external scene viewed by the pilot.

In the above systems described by Gilboa et al, Swift and Cohen and in all similar systems, the viewer sees the scene either with light enhancement, as commonly found in Night Vision Goggles, or else with superimposed images of data from other sources.

U.S. Pat. No. 6,088,165 issued to Janeczko et al. discloses an optical assembly for receiving light from a viewed object via folded and a direct path. An objective lens assembly is included to receive and focus visible and infrared light to visible intensified light. A beam combining means directs the combined light to a viewer's eye. U.S. Pat. No. 6,061,182 issued to Carmeli et al. discloses an optical combiner for viewing a first image and injecting a non-collimated light beam from a second image, presenting a combined image to the viewer. Although both these patents disclose an apparatus capable of providing a direct view, and a combined view of a light intensified with the direct view, there is no mention in either patent about a switch to change views from enhanced to direct viewing.

Other patents disclose devices that superimpose displays or data on an image. U.K. Patent No. 2,115,575A discloses an optical viewing device that includes an eyepiece receiving an image of opto-electric elements whose optical transparency can be varied by varying the voltage applied to the elements. A display is thereby generated that is superimposed on the scene viewed through the eyepiece. This device is directed solely towards superimposition of images.

Therefore, there is still a need in the art for a device that will allow both direct view of the scenery and an enhanced view, simultaneously.

SUMMARY OF THE INVENTION

The present invention relates to an optical path switch for creating two optic pathways for input light. The switch is composed of two polarizers that polarize the input light and two polarization rotators each having two positions. The polarization rotators position translates to one of two the optic pathways. Additionally, the optical path switch has an image enhancement device for producing an enhanced image of the light, and a beam splitter that directs the light to two channels. The optical path switch works by polarizing the light by one of the two polarizers, producing an output. Following, the output is directed through the beam splitter towards two channels. Next, the output is filtered by polarizers at the two channels, where the positions of the two polarization rotators switch the optic pathways.

Therefore, it is an aspect of this invention to provide a visual device that allows for both direct view mode and enhanced view mode to be seen by the observer at the same time.

The present invention also relates to a method of creating two optic pathways for input light, where the first step is directing light from the scenery and through a polarizer. The next step is splitting the light with a beam splitter. One part is directed toward a CCD camera through a polarizer filter, and the other part continues towards the observer's eye through a polarization rotator.

The light from the CCD camera is transferred to an image enhancement device, whose output signal generates an image on a display.

The display's light is directed through a polarization rotator back to the beam splitter where part of the light is directed to the CCD camera. Through the polarizer, and the other part is directed to the observer's eye through the second polarization rotator.

Control of the polarization rotators determines which image light will be seen by the CCD camera and the observer.

It is a further aspect of the invention to provide image enhancement of the observed scenery before displaying it to the observer.

It is another aspect of the present invention to provide an optical path switch which transmits an electronic sampled version of the image to a remote location.

It is another aspect of the present invention to provide a method of achieving an optical switch to determine if the observer will see a direct view of the scenery, or a processed version of it.

It is another aspect of the present invention to provide a method of obtaining an image symbology super imposed over the observed image.

It is another aspect of the present invention to provide a method of transmitting an electronic sampled version of the image to a remote location.

It is another aspect of the present invention to provide a method of switching the optical path for a visual apparatus from an enhanced view to a direct view.

These aspects of the invention are not meant to be exclusive and other features, aspects, and advantages of the present invention will be readily apparent to those of ordinary skill in the art when read in conjunction with the appended claims and accompanying drawings.

DETAILED DESCRIPTION OF THE INVENTION

The optical path switch has two pathways, a scenery pathway and a display pathway.

Figure 1:
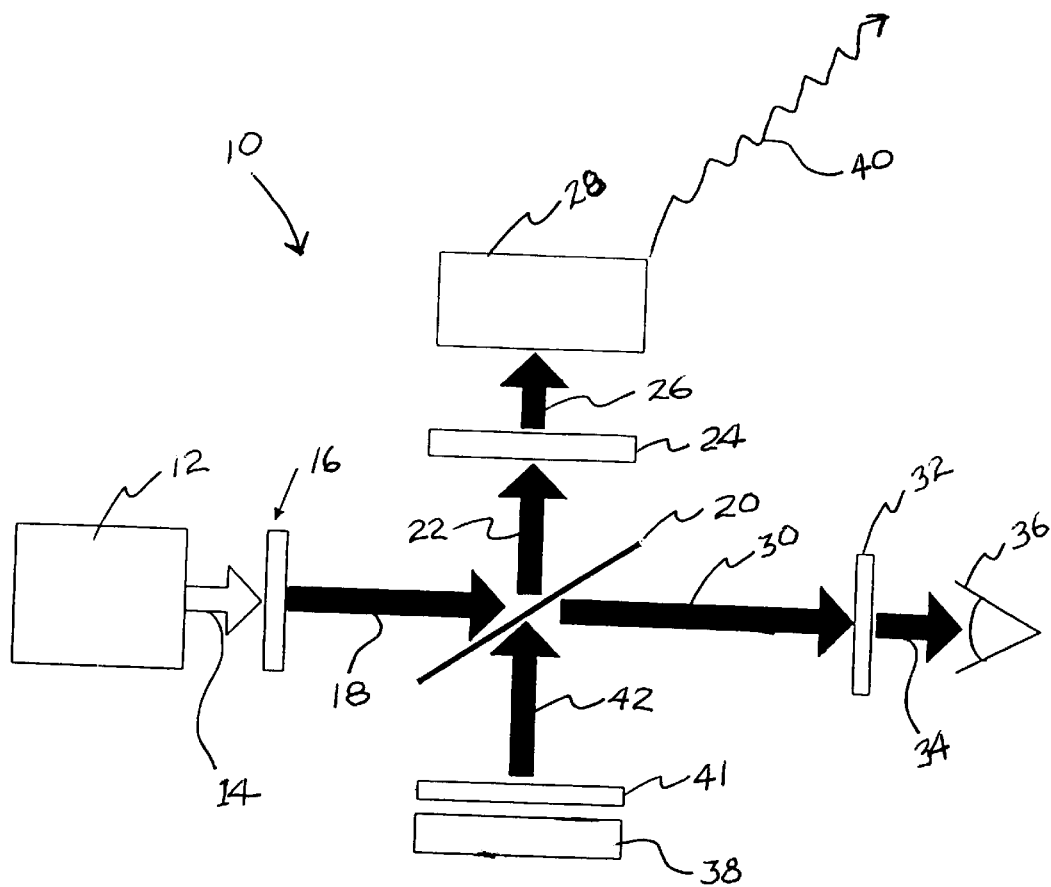
FIG. 1 is a schematic diagram of the direct view mode of the optical path switch.

Referring first to FIG. 1, the direct view mode 10 of the optical path switch is depicted. In the direct view mode 10, the observer 36 sees the scenery 12 and a super imposed image from the display 38. The camera 28 output signal 40 can be transmitted to a remote location. The direct view mode 10 of the optical path switch functions as shown in FIG. 1. The light from the external scenery 12 is first directed through path 14 and through polarizer 16. The light from the scenery 12 is made up of non-polarized light that includes P polarized light and S polarized light. Next, polarizer 16 functions to polarize the light from path 14 into P polarized light only. Next, the P polarized light proceeds through path 18 towards the beam splitter 20. The beam splitter 20 splits the light onto path 22 and path 30. The light follows path 22 towards the P polarizer 24 which allows only P polarized light to pass through. The result is a "P" polarization of the scenery 12. The light then continues on the path 26 towards the camera 28. In the preferred embodiment, the camera 28 is a CCD camera. In other embodiments, the camera 28 is a LCM device. Once in the camera 28, the light is electronically enhanced and is available for transmission 41 to a remote location. Symbology image may be displayed at this time on the display 38. The light from display 38 passes through polarization rotator 41. In the direct view mode 10, the polarization rotators allow only "P" polarization light to pass through, and onto path 42. The beam splitter 20 then splits the light to path 30 and path 22. The light from path 30 then passes through the second polarization rotator 32. Once again, the polarization rotator allows only "P" polarized light to pass through.

Next, the observer 36 is able to view the display 38, which contains the symbology image. The observer 36 will also be able to view the scenery 12. Therefore, at the same time, the observer 36 is able to view the actual image, or scenery 12, as well as superimposed symbology from display 38. Thus, in the direct view mode, the camera 28 sees the scenery 12 and the display 38, as does the observer 36.

Figure 2:
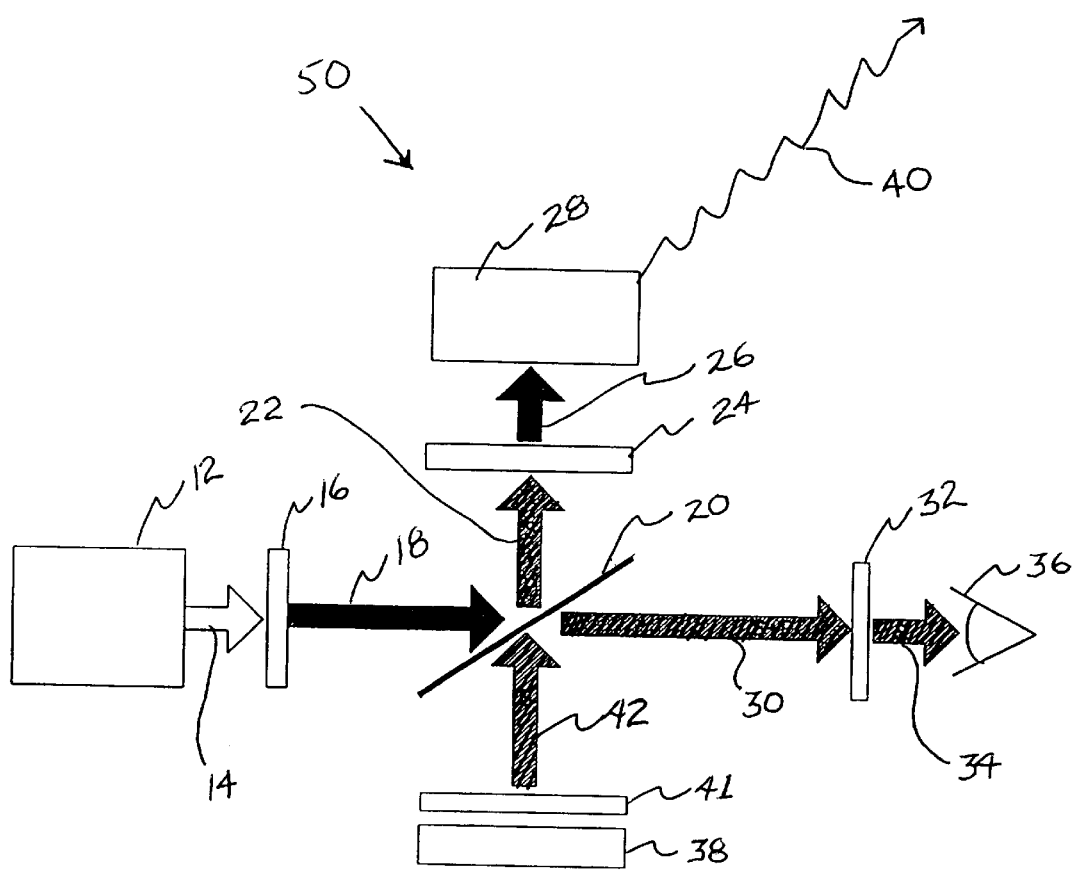
FIG. 2 is a schematic diagram of the enhanced view mode of the optical path switch.

Referring next to FIG. 2, the enhanced view mode 50 of the optical path switch is depicted. In the enhanced view mode 50, the observer 36 does not see the scenery 12 but, in contrast to the direct mode view 10, will view only the display 38. Additionally, the camera 28 will only see the scenery 12, and not see the display 38. The camera 28 output signal 40 can be transmitted to a remote location. The enhanced view mode 50 of the optical path switch functions as shown in FIG. 2. The light from the external scenery 12 is first directed through path 14 and through "P" polarizer 16. The light from the scenery 12 is made up of non-polarized light that includes "P" polarized light and "S" polarized light. Next, polarizer 16 functions to polarize the light from path 14 into "P" polarized light only. Next, the "P" polarized light proceeds through path 18 towards the beam splitter 20. The beam splitter 20 splits the light onto path 22 and path 30. The light follows path 22 towards the "P" polarizer 24 which allows only "P" polarized light to pass through. The light then continues on the path 26 towards the camera 28. In the preferred embodiment, the camera 28 is a CCD camera. In other embodiments, the camera 28 is a LCM device. The camera 28 will only see the scenery 12 since both are at "P" polarization. Once in the camera 28, the light is electronically enhanced and is available for transmission 40 to a remote location, and to the display 38. Once the scenery is on the display 38, the light passes through polarization rotator 40. In the enhanced view mode 50, the polarization rotators allow only "S" polarization light to pass through, and onto path 42. The beam splitter 20 then splits the light to path 30 and path 22. The light from path 30 then passes through the second polarization rotator 32. Once again, the polarization rotator allows only "S" polarized light to pass through.

The "S" polarization optic path is a result of the polarization rotators 32, 40 being both at "S" polarization. The polarization rotators 32, 40 each have two positions. In one position, "P", the polarization rotators 32, 40 allow only "P" polarization light to pass through the polarization rotator 32, 40 and onto the next path. In the other position, "S", the polarization rotators 32, 40 allow only "S" polarization light to pass through the polarization rotator 32, 40 and onto the next path. Since each of the polarization rotators 32, 40 have two distinct positions, whether they are in the "P" or "S" position dictates which view, direct view 10 or enhanced view 50, the optical switch is on. When the polarization rotators 32, 40 are at the same polarization as the other channel, "P" position the scene and display images are mixed together and seen by the camera 28 as well as by the observer 36. When the polarization rotators 32, 40 are at an "S" position, the camera 28 sees just the scenery 12, and the observer 36 sees just the display 38.

The present invention presents three modes. Direct view mode 10, enhanced view mode 50 and a combination of both. The first, direct view mode 10 is where scenery 12 passes directly through optics to the observer 36. The second, enhanced view mode 50 is where the scenery 12 goes to the camera 28, is processed and the result is transmitted 40 to the display 38 and then through a beam splitter 20 and is presented to the observer 36. The combination allows the scenery 12 to go straight through to the observer 36 but also adds certain enhanced elements using the camera 28 and the display 38.

The novelty is the optical switch. There are 2 polarizing routes to give the vision apparatus different modes. The current art presents only one mode or the other, but does not give the user a choice using the same apparatus. The advantage is having the direct view and the enhanced view options available at the same time. Additionally, the camera process to enhance images on vision devices is novel, whereas current art offers only straight through light enhancement, common in the art of night vision goggles. In the art currently, there is a layer in the vision lense that activates when it receives light, it allows light to pass through, and this amplifies the light, allowing one to see an object at night.

The enhancement by the present invention can be accomplished by the CCD (charge couple device), as in the preferred embodiment, but in alternative embodiments the enhancement is performed by an LCD. The CCD, a charge couple device is made up of a plurality of light sensing diodes which translates light information into electrical information. This electrical data can then be enhanced electronically, and produces a digital image. The CCD always receives the data and an attached computer can be programmed in such a way to respond to environmental conditions or to outside computer input. The input activating the response from the CCD can be anything the user wishes it to be. For example, the user can program the computer to amplify light, to amplify one particular color in light, to make the image less fuzzy, to enhance edges of objects or to detect moving objects in the scenery. The advantage of the optical path switch is the ability to view both a direct image and an enhanced image simultaneously, or separately. Uses include super imposing the enhanced image over the direct image, for example, in order to point out targets or identify certain objects in the scenery.

The optical path switch has many practical and diverse applications. The optical path switch has many practical and diverse applications. First, the optical path switch can be used in night vision goggles, including panoramic night vision goggles. In this application, if current lighting conditions are equivalent to starlit nighttime or darker, the user can view an electronically enhanced view. For example, electronic enhancement to the sensitive CCD image can provide a brighter image with increased contrast for improved scene recognition by the user. Or the image can be electronically zoomed to provide a further telescopic image of an area of interest. Or an indication of objects moving in the scene can be displayed in the enhanced image to the user.

The optical path switch could also be used in binoculars. In this application, the user can choose to view an enhanced image. For example, electronic enhancement to the sensitive CCD image can provide a brighter image with increased contrast for improved scene recognition by the user. Or the image can be electronically zoomed to provide a further telescopic image of an area of interest. Or an indication of objects moving in the scene can be displayed in the enhanced image to the user.

The optical path switch could also be used in aircraft pilot goggles. In this application, the user can choose to view an enhanced image. For example, electronic enhancement to the sensitive CCD image can provide a brighter image with increased contrast for improved scene recognition by the user. Or the image can be electronically enhanced to indicate objects of concern such as the horizon, trees, poles, power cables, and telephone lines, and landing area markers or lights.

Although the present invention has been described with reference to certain preferred embodiments thereof, other versions are readily apparent to those of ordinary skill in the art. Therefore, the spirit and scope of the appended claims should not be limited to the description of the preferred embodiments contained herein.

What is claimed is:

1. An optical path switch for creating two optical pathways for input light from a single common optical pathway, said switch comprising:
   two polarizers that polarize said input light;
   two polarization rotators each having two positions, said polarization rotators position translate to one of two said optical pathways;
   an image enhancement device for producing an enhanced image of said light; and
   a beam splitter that directs said light to two channels, whereby said light is polarized by one of said two polarizers producing an output, said output is then directed through said beam splitter where said output is directed towards one of said two channels, the output is then filtered through said two polarization rotators and to the other of said two channels, said positions of said two polarization rotators switch said optical pathways.

2. The optical path switch in claim 1, wherein said image enhancement device is a CCD.

3. The optical path switch in claim 1, wherein said image enhancement device is a LCD.

4. A method of creating two optical pathways for input light from a single common optical pathway, the method comprising the steps of:

directing light from scenery and through a polarizer;

splitting the light with a beam splitter;

directing light to an image enhancement device;

transmitting light to a display; and directing light through a two polarization rotators.

5. The method in claim 4, wherein said image enhancement device is a CCD camera.

6. The method in claim 4, wherein said image enhancement device is a LCD.

* * * * *